(12) United States Patent
Tang

(10) Patent No.: US 9,897,872 B2
(45) Date of Patent: Feb. 20, 2018

(54) LIQUID CRYSTAL DISPLAY PANEL WITH SWITCHABLE VIEWING ANGLE AND DRIVING METHOD THEREOF

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 11 days.

(21) Appl. No.: 14/418,607

(22) PCT Filed: Jan. 20, 2015

(86) PCT No.: PCT/CN2015/071066
§ 371 (c)(1),
(2) Date: May 10, 2016

(87) PCT Pub. No.: WO2016/106883
PCT Pub. Date: Jul. 7, 2016

(65) Prior Publication Data
US 2016/0246138 A1   Aug. 25, 2016

(30) Foreign Application Priority Data

Dec. 31, 2014   (CN) .......................... 2014 1 0856071

(51) Int. Cl.
*G02F 1/1337* (2006.01)
*G02F 1/1343* (2006.01)
(Continued)

(52) U.S. Cl.
CPC ...... *G02F 1/134363* (2013.01); *G02F 1/1323* (2013.01); *G02F 1/13306* (2013.01);
(Continued)

(58) Field of Classification Search
CPC .. G02F 1/1323; G02F 1/134363; G02F 1/133; G02F 1/13306; G02F 1/134309;
(Continued)

(56) References Cited

U.S. PATENT DOCUMENTS

| 2007/0121047 A1* | 5/2007 | Chung .............. G02F 1/134363 349/141 |
| 2008/0273134 A1* | 11/2008 | Kim ...................... G02F 1/1323 349/43 |
| 2013/0114025 A1 | 5/2013 | Lin et al. |

FOREIGN PATENT DOCUMENTS

| CN | 102253541 A | 11/2011 |
| CN | 102540528 A | 7/2012 |

(Continued)

OTHER PUBLICATIONS

International Search Report and Written Opinion, dated Jan. 20, 2015, China.

*Primary Examiner* — Thoi Duong
(74) *Attorney, Agent, or Firm* — Kim Winston LLP

(57) ABSTRACT

Disclosed is a liquid crystal display panel with a switchable viewing angle and a driving method thereof. A pixel unit located in a display area of the liquid crystal display panel comprises: a main pixel region, which is horizontally aligned, wherein pixel electrodes and common electrodes are alternately arranged on the lower substrate and spaced from one another; and a sub-pixel region, which is perpendicularly aligned, wherein upper substrate electrodes and corresponding pixel electrodes are arranged below the upper substrate and on the lower substrate, respectively. When no bias voltage is applied to the upper substrate electrodes in the sub-pixel region, liquid crystal molecules corresponding to the sub-pixel region do not deflect, such that large viewing angle light leakage occurs in the sub-pixel region, thereby achieving narrow viewing angle display. When a bias volt- (Continued)

age is applied to the upper substrate electrodes in the sub-pixel region, the liquid crystal molecules corresponding to the sub-pixel region deflect to a flat state, such that large viewing angle light leakage ceases in the sub-pixel region, thereby achieving wide viewing angle display.

11 Claims, 3 Drawing Sheets

(51) Int. Cl.
*G02F 1/133* (2006.01)
*G02F 1/13* (2006.01)
*G02F 1/13363* (2006.01)

(52) U.S. Cl.
CPC .... *G02F 1/13439* (2013.01); *G02F 1/133711* (2013.01); *G02F 1/133753* (2013.01); *G02F 2001/133638* (2013.01); *G02F 2001/133757* (2013.01); *G02F 2001/134345* (2013.01); *G02F 2001/134372* (2013.01); *G02F 2001/134381* (2013.01); *G02F 2413/04* (2013.01); *G02F 2413/06* (2013.01)

(58) Field of Classification Search
CPC ............. G02F 1/1337; G02F 1/133753; G02F 1/1343; G02F 1/1368; G02F 2001/134372; G02F 2001/134381; G02F 2001/134345; G02F 2001/133746; G02F 2001/133738; G02F 2001/133749; G02F 2201/123; G02F 1/133711; G02F 1/133723; G09G 3/36; G09G 3/3648; G09G 3/3696; G09G 2320/068; G09G 2320/028
USPC ... 349/123, 132, 141, 187, 33, 34, 129, 130, 349/144
See application file for complete search history.

(56) References Cited

FOREIGN PATENT DOCUMENTS

| | | |
|---|---|---|
| CN | 102636919 A | 8/2012 |
| KR | 1020080049304 A | 6/2008 |
| KR | 1020110000823 A | 1/2011 |
| TW | 200617859 A | 11/1993 |

* cited by examiner

LIQUID CRYSTAL DISPLAY PANEL WITH SWITCHABLE VIEWING ANGLE AND DRIVING METHOD THEREOF

The present application claims benefit of Chinese patent application CN 201410856071.1, entitled "Liquid crystal display panel with switchable viewing angle and driving method thereof" and filed on Dec. 31, 2014, the entirety of which is incorporated herein by reference.

FIELD OF THE INVENTION

The present disclosure relates to a technology of liquid crystal displays, and in particular, to a liquid crystal display panel with a switchable viewing angle and a driving method thereof.

BACKGROUND OF THE INVENTION

A viewing angle range (viewing angle for short) is an important performance index of a liquid crystal display panel. It is necessary for a liquid crystal display panel to vary a polarization state of light transmitted therethrough via adjusting orientation of liquid crystal molecules, so as to achieve a display function. Due to influences of optical anisotropy of liquid crystal molecules, a liquid crystal display device has a smaller viewing angle than a cathode-ray tube display device. In order to increase the viewing angle of the liquid crystal display device, the techniques of vertical alignment (VA) mode, pattern vertical alignment (PVA) mode, multi-domain vertical alignment (MVA) mode, in-plane switching (IPS) mode, fringe field switching (FFS) mode are successively proposed as technologies constantly develop, thereby achieving wide viewing angle display of the liquid crystal display device.

Although liquid crystal display panels tend to have wider viewing angles now, under certain conditions, a switching function between a wide viewing angle and a narrow viewing angle is still necessary for a liquid crystal display panel. This is especially true for a portable electronic apparatus, e.g., a mobile phone, a pocket computer, or a notebook computer, which uses a liquid crystal display device. For instance, a user may, sometimes need to share images stored in the portable electronic apparatus with other persons, while at other times, expect to protect the images stored in the portable electronic apparatus from other persons as privacy. Therefore, it is necessary to provide a liquid crystal display panel with a switchable viewing angle.

In the prior art, researchers have put forward the following solutions to switching between a wide viewing angle and a narrow viewing angle.

To start with, a shutter shielding film can be used. When a user expects the liquid crystal display to display pictures at a narrow viewing angle, a shutter shielding film can be coated on a screen of the liquid crystal display panel. Such a procedure is inconvenient to operate. Besides, the user has to take the shutter shielding film along with him/her.

Moreover, a double backlight system can be used. According to the double backlight system, an ordinary backlight system can be used to achieve wide viewing angle display, and a collimating backlight system can be further used to achieve narrow viewing angle display. This system will undoubtedly increase manufacturing costs, thickness, and energy consumption of the liquid crystal display panel.

In addition, a double-layer liquid crystal display panel can be used. That is, a main liquid crystal display panel can be used to display images normally, and an additional liquid crystal display panel can be employed to control viewing angles for display. This double-layer liquid crystal display panel will also increase manufacturing costs, thickness, and energy consumption of the liquid crystal display panel.

Obviously, none of the above liquid crystal display panels can satisfy the requirements of a portable electronic apparatus for size or energy consumption.

Therefore, the inventor of the present disclosure, based on practical experience in designing and manufacturing liquid crystal display panels, and relevant professional knowledge thereof, has proposed a liquid crystal display panel with a switchable viewing angle, which has a simpler structure and is more convenient to operate, thereby satisfying high requirements of portable electronic apparatuses, such as mobile phones, for stable circuits, weight, and energy consumption.

SUMMARY OF THE INVENTION

Directed against the above problems, the present disclosure provides a liquid crystal display panel with a switchable viewing angle, which has a simpler structure and is more convenient to operate, and a driving method thereof.

In order to solve the above technical problems, the present disclosure provides a liquid crystal display panel with a switchable viewing angle, comprising an upper substrate, a lower substrate, and a liquid crystal layer provided therebetween. A pixel unit located in a display area comprises: a main pixel region, which is horizontally aligned, wherein pixel electrodes and common electrodes are alternately arranged on the lower substrate and spaced from one another; and a sub-pixel region, which is perpendicularly aligned, wherein upper substrate electrodes and corresponding pixel electrodes are arranged below the upper substrate and on the lower substrate, respectively. When no bias voltage is applied to the upper substrate electrodes in the sub-pixel region, liquid crystal molecules corresponding to the sub-pixel region do not deflect, such that large viewing angle light leakage occurs in the sub-pixel region, thereby achieving narrow viewing angle display. When a bias voltage is applied to the upper substrate electrodes in the sub-pixel region, the liquid crystal molecules corresponding to the sub-pixel region deflect to a flat state, such that large viewing angle light leakage ceases in the sub-pixel region, thereby achieving wide viewing angle display.

According to one embodiment of the present disclosure, the above liquid crystal display panel further comprises two display drivers, respectively used for controlling voltages of the electrodes in the main pixel region and the sub-pixel region, wherein when only one of the display drivers applies a voltage to the electrodes in the main pixel region, the liquid crystal display panel will be in a narrow viewing angle mode; while when the two display drivers simultaneously apply voltages to the electrodes in both the main pixel region and the sub-pixel region, the liquid crystal display panel will be in a wide viewing angle mode.

According to one embodiment of the present disclosure, the liquid crystal molecules in the main pixel region rotate in a plane parallel with the upper substrate and the lower substrate, which forms an IPS or FFS operating mode.

According to one embodiment of the present disclosure, the liquid crystal molecules in the sub-pixel region rotate in a plane perpendicular to the upper substrate and the lower substrate, which forms a VA operating mode.

According to one embodiment of the present disclosure, the pixel electrodes and the common electrodes that are located in the main pixel region, and the upper substrate electrodes and the pixel electrodes that are located in the sub-pixel region are all made of transparent conductive material.

According to one embodiment of the present disclosure, one and a same polypropylene imine material is used to achieve horizontal alignment of the main pixel region and perpendicular alignment of the sub-pixel region.

According to one embodiment of the present disclosure, different polypropylene imine materials are used to achieve horizontal alignment of the main pixel region and perpendicular alignment of the sub-pixel region, respectively.

In addition, the present disclosure further provides a driving method of a liquid crystal display panel with a switchable viewing angle. A pixel unit in a display area of the liquid crystal display panel comprises: a main pixel region, which is horizontally aligned, wherein pixel electrodes and common electrodes are alternately arranged on the lower substrate and spaced from one another; and a sub-pixel region, which is perpendicularly aligned, wherein upper substrate electrodes and corresponding pixel electrodes are arranged below the upper substrate and on the lower substrate, respectively. The driving method comprises the steps of: applying no bias voltage, in a narrow viewing angle display mode, to the upper substrate electrodes in the sub-pixel region, such that liquid crystal molecules corresponding to the sub-pixel region do not deflect, thereby causing large viewing angle light leakage in the sub-pixel region; and applying a bias voltage, in a wide viewing angle display mode, to the upper substrate electrodes in the sub-pixel region, such that the liquid crystal molecules corresponding to the sub-pixel region deflect to a flat state, thereby ceasing large viewing angle light leakage in the sub-pixel region.

According to one embodiment of the present disclosure, in the above driving method, the liquid crystal molecules in the main pixel region rotate in a plane parallel with the upper substrate and the lower substrate, which forms an IPS or FFS operating mode.

According to one embodiment of the present disclosure, in the above driving method, the liquid crystal molecules in the sub-pixel region rotate in a plane perpendicular to the upper substrate and the lower substrate, which forms a VA operating mode.

Compared with the prior art, one or more embodiment of the present disclosure can has the following advantages.

According to the present disclosure, the wide viewing angle mode or the narrow viewing angle mode can be selected depending on whether the bias voltage is to be applied to the upper substrate electrodes, which is easy to operate. In addition, according to the present disclosure, the bias voltage can be applied to the upper substrate electrodes to achieve the wide viewing angle mode, which is suitable for negative liquid crystal material. Compared with a conventional liquid crystal display device using a double backlight system or a double-layer liquid crystal display panel to achieve switching between wide and narrow viewing angles, the liquid crystal display device provided in the present disclosure has an attenuated liquid crystal display panel, and reduced manufacturing costs and energy consumption.

Other features and advantages of the present disclosure will be further explained in the following description, and partly become self-evident therefrom, or be understood through implementing the present disclosure. The objectives and advantages of the present disclosure will be achieved through the structure specifically pointed out in the description, claims, and the accompanying drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

The present disclosure is based on hybrid light distribution technology. In order to explain the purposes, technical solutions, and advantages of the present disclosure more explicitly, the present disclosure will be further described in detail with reference to the accompany drawings.

The present disclosure will be explained in detail with reference to FIGS. 1-3 in the following.

Figure 1:
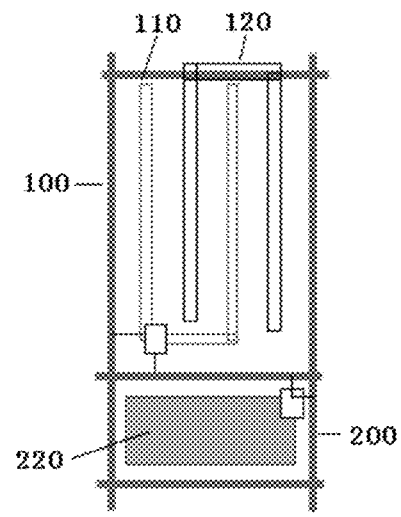
FIG. 1 is a partial top view of a display area of a liquid crystal display panel according to an embodiment of the present disclosure.

FIG. 1 is a partial top view of a display area of a liquid crystal display panel according to a first embodiment of the present disclosure. As is in the prior art, the panel comprises an upper substrate 10 and a lower substrate 30 parallel with each other, and a liquid crystal layer 20, preferably negative liquid crystal material, provided between the upper substrate 10 and the lower substrate 30.

In the present embodiment, the upper substrate 10 can comprise an upper substrate glass layer, an upper substrate quarter-wave plate, an upper substrate half-wave plate, and an upper substrate polarizer; and the lower substrate 30 can comprise a lower substrate glass layer, a lower substrate quarter-wave plate, a lower substrate half-wave plate, and a lower substrate polarizer. The upper substrate quarter-wave plate and the lower substrate quarter-wave plate have parallel optical axes; the upper substrate half-wave plate and the lower substrate half-wave plate have parallel optical axes; and the upper substrate polarizer and the lower substrate polarizer have optical axes perpendicular to each other.

A pixel unit located in the display area comprises a main pixel region 100 and a sub-pixel region 200.

The main pixel region 100 is horizontally aligned, wherein thin striped pixel electrodes 110 and common electrodes 120, which are parallel with one another, are alternately arranged on the lower substrate 30 and spaced from one another. Typically, the pixel electrodes 110 and the common electrodes 120 have the same width, and are spaced from one another at equal intervals.

The sub-pixel region 200 is perpendicularly aligned, wherein upper substrate electrodes 210 and corresponding pixel electrodes 220 are respectively arranged below the upper substrate 10 and on the lower substrate 30.

The aforementioned pixel electrodes 110 and common electrodes 120 that are located in the main pixel region 110, and the upper substrate electrodes 210 and the pixel electrodes 220 that are located in the sub-pixel region 200 can all be made of transparent conductive materials, which can be at least one selected from a group consisting of ITO, IZO, and IGO.

In addition, in order to achieve switching between a wide viewing angle and a narrow viewing angle, the main pixel region 100 can be horizontally aligned, and the sub-pixel region 200 can be perpendicularly aligned. Specifically, one and a same polypropylene imine material or different polypropylene imine materials can be used to perform optical alignment.

If one and a same polypropylene imine material is used, a mask can be used to first cover the sub-pixel region during a horizontal alignment operation on the main pixel region, and then to cover the main pixel area during a perpendicular alignment operation on the sub-pixel region.

If different polypropylene imine materials are used, a perpendicular alignment film can be first formed in the sub-pixel region, without a friction procedure, and then a horizontal alignment film can be coated on the perpendicular alignment film, followed by execution of a friction procedure, so as to achieve horizontal alignment. Subsequently, the horizontal alignment film coated on the perpendicular alignment film in the sub-pixel region can be selectively removed through photoetching, so as to expose the perpendicular alignment film in the sub-pixel region.

Appropriate voltages can be applied to the electrodes in the horizontally aligned main pixel region and perpendicularly aligned sub-pixel region, so as to deflect corresponding liquid crystal molecules in the main pixel region and the sub-pixel region in proper manners, respectively. The liquid crystal display panel can thereby achieve narrow viewing angle display and wide viewing angle display respectively. For example, the liquid crystal molecules in the main pixel region rotate in a plane parallel with the upper substrate and the lower substrate, which forms an IPS or FFS operating mode. And the liquid crystal molecules in the sub-pixel region rotate in a plane perpendicular to the upper substrate and the lower substrate, which forms a VA operating mode.

Specific operating modes are as follows.

Figure 2A:
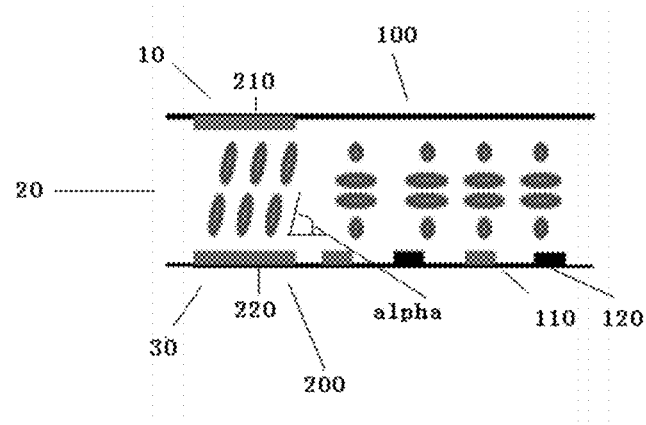
FIG. 2A shows a deflection state of liquid crystal molecules when the liquid crystal display panel of FIG. 1 is in a narrow viewing angle bright state.
Figure 2B:
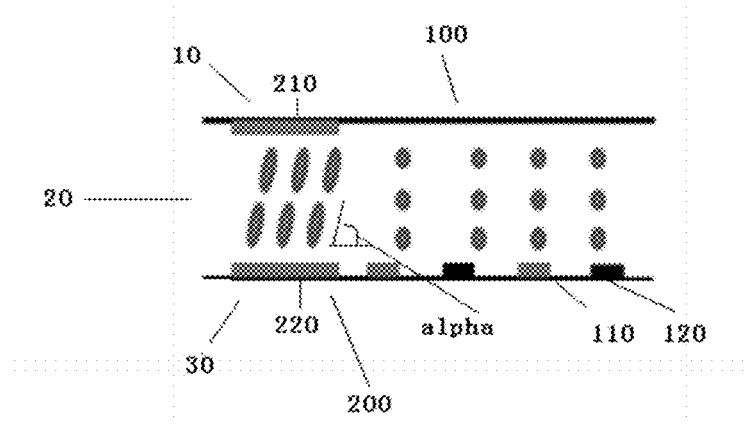
FIG. 2B shows a deflection state of the liquid crystal molecules when the liquid crystal display panel of FIG. 1 is in a narrow viewing angle dark state.

FIGS. 2A and 2B show deflection states of the liquid crystal molecules when the above liquid crystal display panel is in a narrow viewing angle display mode.

When a corresponding voltage is applied to the electrodes in the main pixel region (pixel electrodes and/or common electrodes) only, the corresponding liquid crystal molecules in the main pixel region will rotate in a plane parallel with the upper and lower substrates, due to the horizontal alignment of the main pixel region. The voltage can be controlled in size to vary a rotating angle of the liquid crystal molecules in the plane parallel with the upper and lower substrates. Meanwhile, since no bias voltage is applied to the upper substrate electrodes in the sub-pixel region, or a bias voltage applied to the upper substrate electrodes in the sub-pixel region is too low to drive the liquid crystal molecules to deflect, the corresponding liquid crystal molecules in the sub-pixel region maintain a large pretilt angle (marked as alpha in the figures). Under such circumstances, when the display screen is viewed at a large viewing angle, lateral light leakage will occur in the sub-pixel region, thereby achieving narrow viewing angle display of the liquid crystal display panel.

Figure 3A:
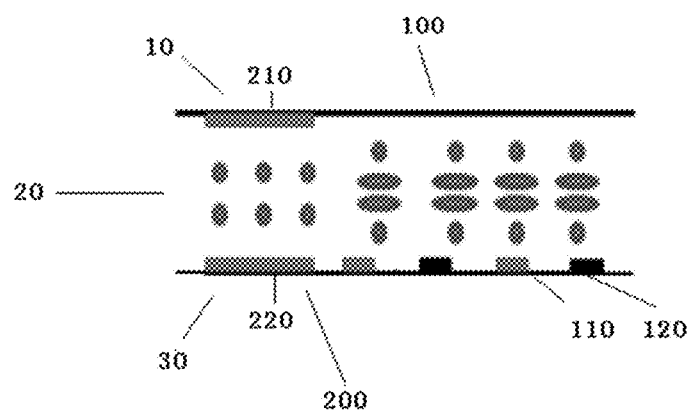
FIG. 3A shows a deflection state of the liquid crystal molecules when the liquid crystal display panel of FIG. 1 is in a wide viewing angle bright state.
Figure 3B:
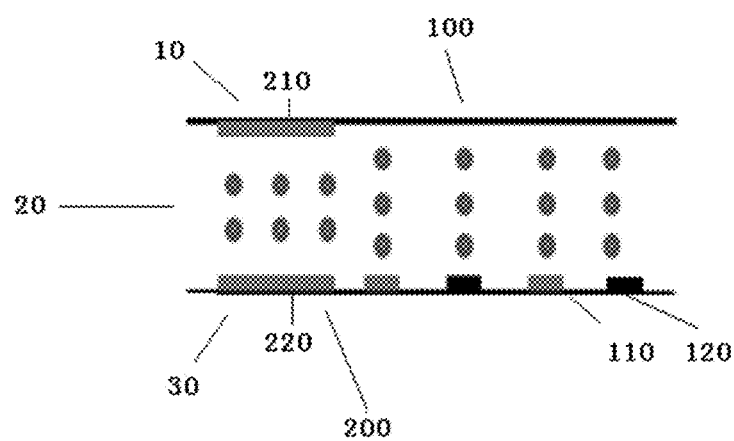
FIG. 3B shows a deflection state of the liquid crystal molecules when the liquid crystal display panel of FIG. 1 is in a wide viewing angle dark state.

FIGS. 3A and 3B show deflection states of the liquid crystal molecules when the above liquid crystal display panel is in a wide viewing angle display mode.

When a corresponding voltage is applied to the electrodes (pixel electrodes and/or common electrodes) in the main pixel region, the corresponding liquid crystal molecules in the main pixel region will rotate in a plane parallel with the upper and lower substrates, due to the horizontal alignment of the main pixel region. The voltage can be controlled in size to vary a rotating angle of the liquid crystal molecules in the plane parallel with the upper and lower substrates. Meanwhile, a corresponding bias voltage is applied to the upper substrate electrodes in the sub-pixel region, or the bias voltage applied to the upper substrate electrodes in the sub-pixel region is so high as to exceed a voltage threshold for driving liquid crystal molecules to deflect, the corresponding liquid crystal molecules in the sub-pixel region thus deflect, thereby rendering the pretilt angle (marked as alpha in the figures) smaller. When the voltage reaches a certain value, the liquid crystal molecules in the sub-pixel region will completely fall in a flat state. As a result, light leakage will disappear from the sub-pixel region viewed at a large viewing angle, thereby achieving wide viewing angle display of the liquid crystal display panel.

As such, in a specific embodiment, two display drivers can be arranged, for controlling the voltages of electrodes in the main pixel region and the sub-pixel region, respectively, thereby achieving switching between the narrow viewing angle display and the wide viewing angle display. For example, when only one of the display drivers is applying a voltage to the electrodes in the main pixel region, the liquid crystal display panel will be in a narrow viewing angle mode, while when the two display drivers are applying voltages to the electrodes in the main pixel region and the sub-pixel region simultaneously, the liquid crystal display panel will be in a wide viewing angle mode.

It should be noted that, as required in specific implementation, a constant voltage can be applied to the common electrodes in the main pixel region, and a voltage can be applied to corresponding pixel electrodes only, to achieve the purpose of controlling deflection of the liquid crystal molecules in the main pixel region. It has been already known to apply a voltage to the pixel electrodes in the main pixel region or the sub-pixel region for controlling deflection angles of the liquid crystal molecules, which will therefore not be described in detail herein.

In the present disclosure, the bias voltage is applied to the upper substrate electrodes in the sub-pixel region to achieve the wide viewing angle mode, thereby achieving convenient switching between the wide viewing angle and the narrow viewing angle. This is especially suitable for a liquid crystal panel using negative liquid crystal material. Compared with a conventional display device using a double backlight system or a double-layer liquid crystal display panel, the liquid crystal display device provided in the present disclosure which can achieve switching between wide and narrow viewing angles has an attenuated liquid crystal display panel, and reduced manufacturing costs and energy consumption.

The above description should not be construed as limitations of the present disclosure, but merely as exemplifications of preferred embodiments thereof. Any variations or replacements that can be readily envisioned by those skilled in the art are intended to be within the scope of the present disclosure.

The invention claimed is:

1. A liquid crystal display panel with a switchable viewing angle, comprising an upper substrate, a lower substrate, and a liquid crystal layer provided there between,
wherein a pixel unit located in a display area comprises:
 a main pixel region, which is horizontally aligned, wherein pixel electrodes and common electrodes are alternately arranged on the lower substrate and spaced from one another, and a sub-pixel region, which is perpendicularly aligned, wherein upper substrate electrodes and corresponding pixel electrodes are arranged below the upper substrate and on the lower substrate, respectively, and wherein when no bias voltage is applied to the upper substrate electrodes in the sub-pixel region, liquid crystal molecules corresponding to the sub-pixel region do not deflect, such that large viewing angle light leakage occurs in the sub-pixel region, thereby achieving narrow viewing angle display; while when a bias voltage is applied to the upper substrate electrodes in the sub-pixel region, the liquid crystal molecules corresponding to the sub-pixel region deflect to a flat state, such that large viewing angle light leakage ceases in the sub-pixel region, thereby achieving wide viewing angle display;

wherein one and a same polypropylene imine material is used to achieve horizontal alignment of the main pixel region and perpendicular alignment of the sub-pixel region.

2. The liquid crystal display panel according to claim 1, further comprising two display drivers, respectively used for controlling voltages of the electrodes in the main pixel region and the sub-pixel region, wherein when only one of the display drivers applies a voltage to the electrodes in the main pixel region, the liquid crystal display panel will be in a narrow viewing angle mode; while when the two display drivers simultaneously apply voltages to the electrodes in both the main pixel region and the sub-pixel region, the liquid crystal display panel will be in a wide viewing angle mode.

3. The liquid crystal display panel according to claim 2, wherein the liquid crystal molecules in the main pixel region rotate in a plane parallel with the upper substrate and the lower substrate, which forms an IPS or FFS operating mode.

4. The liquid crystal display panel according to claim 2, wherein the liquid crystal molecules in the sub-pixel region rotate in a plane perpendicular to the upper substrate and the lower substrate, which forms a VA operating mode.

5. The liquid crystal display panel according to claim 1, wherein the liquid crystal molecules in the main pixel region rotate in a plane parallel with the upper substrate and the lower substrate, which forms an IPS or FFS operating mode.

6. The liquid crystal display panel according to claim 5, wherein the liquid crystal molecules in the sub-pixel region rotate in a plane perpendicular to the upper substrate and the lower substrate, which forms a VA operating mode.

7. The liquid crystal display panel according to claim 1, wherein the liquid crystal molecules in the sub-pixel region rotate in a plane perpendicular to the upper substrate and the lower substrate, which forms a VA operating mode.

8. The liquid crystal display panel according to claim 1, wherein the pixel electrodes and the common electrodes that are located in the main pixel region, and the upper substrate electrodes and the pixel electrodes that are located in the sub-pixel region are all made of transparent conductive material.

9. A liquid crystal display panel with a switchable viewing angle, comprising an upper substrate, a lower substrate, and a liquid crystal layer provided therebetween, wherein a pixel unit located in a display area comprises:
a main pixel region, which is horizontally aligned, wherein pixel electrodes and common electrodes are alternately arranged on the lower substrate and spaced from one another, and a sub-pixel region, which is perpendicularly aligned, wherein upper substrate electrodes and corresponding pixel electrodes are arranged below the upper substrate and on the lower substrate, respectively, and wherein when no bias voltage is applied to the upper substrate electrodes in the sub-pixel region, liquid crystal molecules corresponding to the sub-pixel region do not deflect, such that large viewing angle light leakage occurs in the sub-pixel region, thereby achieving narrow viewing angle display; while when a bias voltage is applied to the upper substrate electrodes in the sub-pixel region, the liquid crystal molecules corresponding to the sub-pixel region deflect to a flat state, such that large viewing angle light leakage ceases in the sub-pixel region, thereby achieving wide viewing angle display;

wherein different polypropylene imine materials are used to achieve horizontal alignment of the main pixel region and perpendicular alignment of the sub-pixel region, respectively.

10. The liquid crystal display panel according to claim 9, further comprising two display drivers, respectively used for controlling voltages of the electrodes in the main pixel region and the sub-pixel region, wherein when only one of the display drivers applies a voltage to the electrodes in the main pixel region, the liquid crystal display panel will be in a narrow viewing angle mode; while when the two display drivers simultaneously apply voltages to the electrodes in both the main pixel region and the sub-pixel region, the liquid crystal display panel will be in a wide viewing angle mode.

11. The liquid crystal display panel according to claim 9, wherein the liquid crystal molecules in the main pixel region rotate in a plane parallel with the upper substrate and the lower substrate, which forms an IPS or FFS operating mode.

* * * * *